July 12, 1949. I. M. A. GARCIA Re. 23,132

MACHINE AND METHOD OF UNITING SUPERIMPOSED FABRICS

Original Filed Sept. 8, 1942 3 Sheets-Sheet 1

INVENTOR.
Ivan M. A. Garcia
BY
Victor J. Evans & Co.
ATTORNEYS

MACHINE AND METHOD OF UNITING SUPERIMPOSED FABRICS
Original Filed Sept. 8, 1942 3 Sheets-Sheet 2
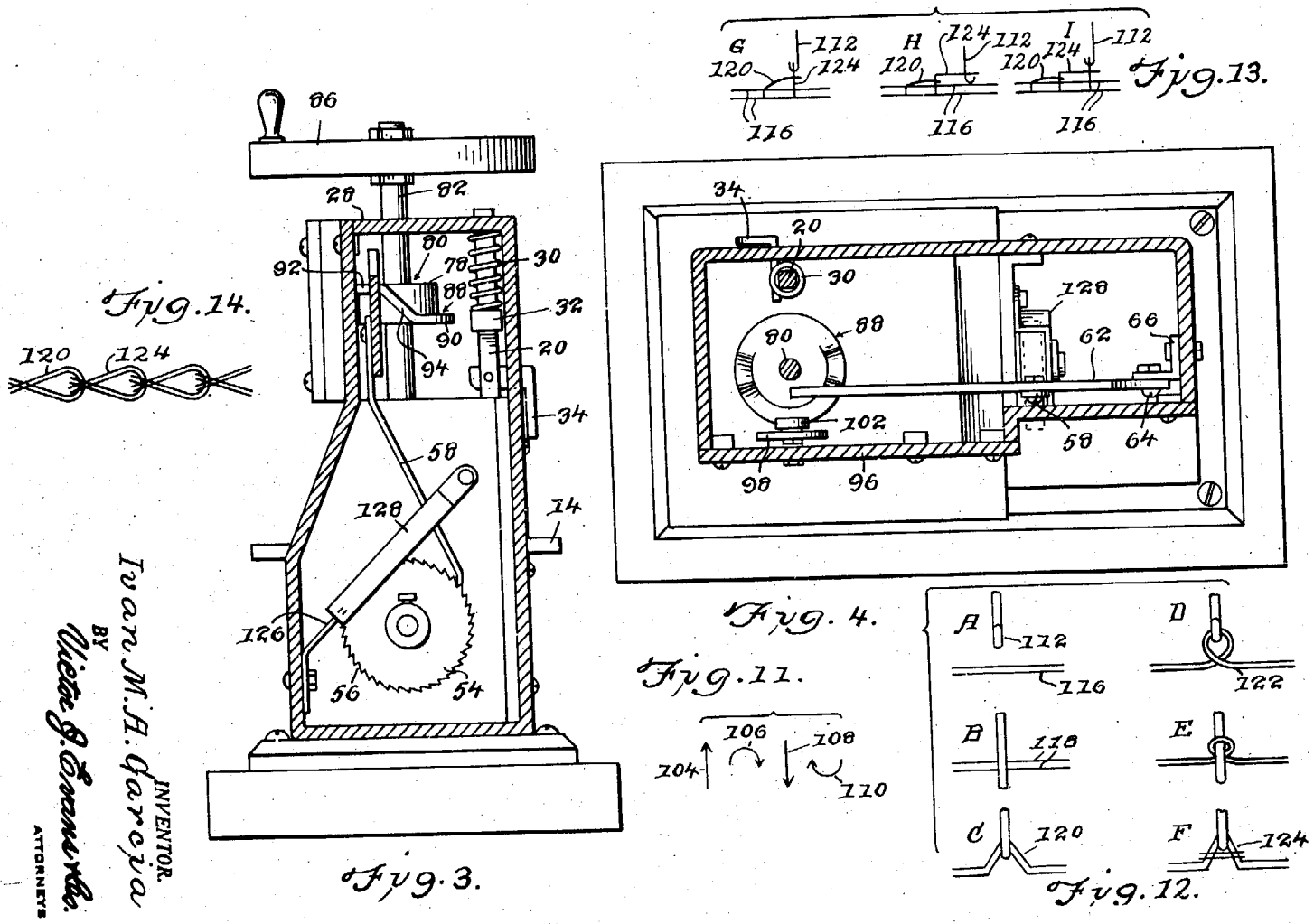
INVENTOR.
Ivan M. A. Garcia
BY
Victor J. Evans & Co.
ATTORNEYS July 12, 1949. I. M. A. GARCIA Re. 23,132

MACHINE AND METHOD OF UNITING SUPERIMPOSED FABRICS

Original Filed Sept. 8, 1942 3 Sheets-Sheet 3

INVENTOR.
Ivan M. A. Garcia
BY
Victor J. Evans & Co.
ATTORNEYS

Reissued July 12, 1949

Re. 23,132

UNITED STATES PATENT OFFICE 23,132

MACHINE AND METHOD OF UNITING SUPERIMPOSED FABRICS

Iván M. A. Garcia, Richland, Wash.

Original No. 2,407,148, dated September 3, 1946, Serial No. 457,668, dated September 8, 1942. Application for reissue December 8, 1947, Serial No. 791,775

22 Claims. (Cl. 112—198)

My invention relates to sewing machines and a method of sewing, and has among its objects and advantages the provision of an improved machine and method for stitching fabrics by looping together threads of the fabrics acted upon.

In the accompanying drawings:

Figure 3 is a sectional view taken along the line 3—3 of Figure 2;

Figure 4 is a sectional view taken along the line 4—4 of Figure 2;

Figure 11 is a diagrammatic view illustrating the needle action;

Figure 12 is a diagrammatic view illustrating the needle action with respect to the formation of interlocking sewing loops from the fabric being sewed;

Figure 13 is a diagrammatic view showing the action of the needle during the operation of completing engaged loops; and Figure 14 is a detail view of the interengaged loops formed by the needle.

Figure 2:
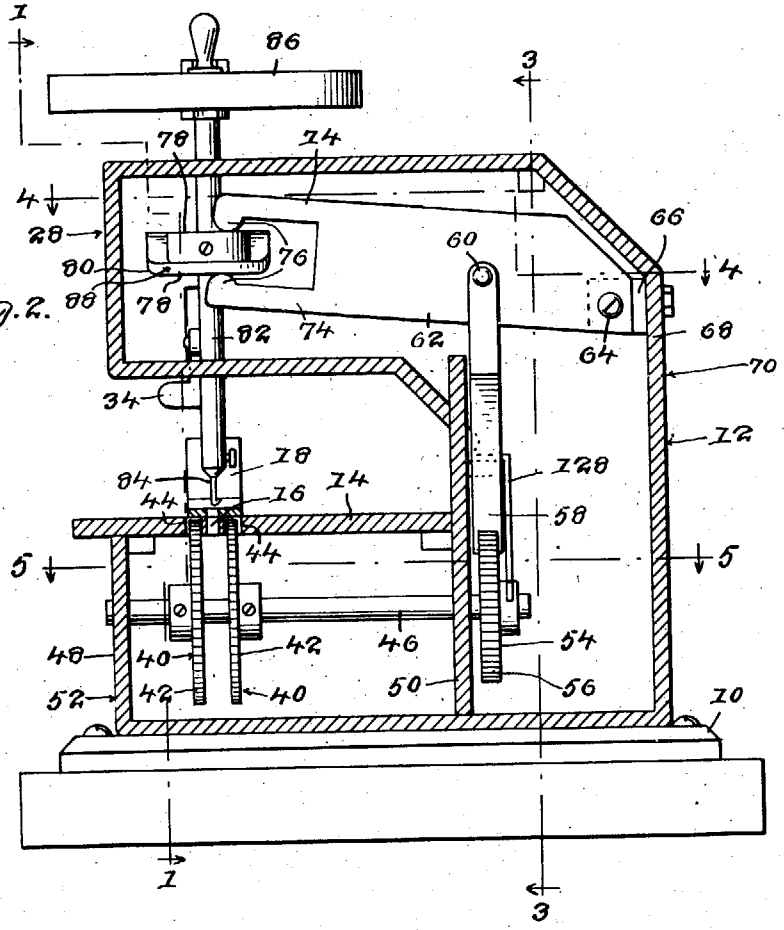
Figure 2 is a sectional view taken along the line 2—2 of Figure 1.

In the embodiment selected for illustration, I make use of a base 10 upon which the sewing machine 12 is mounted. The machine includes a horizontal bed plate 14 provided with a needle opening 16. A presser 18 is attached to the lower end of a vertical bar 20 square in cross section and guided for vertical movement in openings 22 in the walls 24 and 26 of a housing 28 spaced vertically from the bed plate 14. The presser 18 is yieldingly pressed against the bed plate 14 by reason of a compression spring 30 having one end engaging the wall 26 and its other end engaging a collar 32 secured to the bar 20. The fabric being sewed is arranged between the presser 18 and the bed plate 14 in the usual manner. A finger bar 34 is attached to the bar 20 and extends through a slot 36 in the wall 38 of the housing 28 to facilitate lifting of the presser, as when the work is being placed in position on the bed plate 14.

Means for feeding the work comprises two wheels 40 having notched peripheral faces 42, portions of which peripheries extend through slots 44 in the bed plate 14 for engagement with the work. Both wheels 40 are fixed to a shaft 46 rotatably journaled in the walls 48 and 50 of the base housing 52. To the shaft 46 and exteriorly of the housing 52 is keyed a wheel 54 having a notched peripheral face 56 engaged by a feeder link 58 having its upper end pivotally connected at 60 with a lever 62 having one end pivotally connected at 64 to a bracket 66 attached to a wall 68 of the arm 70 which constitutes a support for the housing 28.

The opposite end of the lever 62 is provided with two spaced fingers 74 having bearing formations 76 lying in engagement with the opposite faces 78 of a cam 80 fixed to a vertical bar 82 to the lower end of which the needle 84 is detachably connected. This bar may be rotated through the medium of a handwheel 86 or other source of power (not shown).

Figure 9:
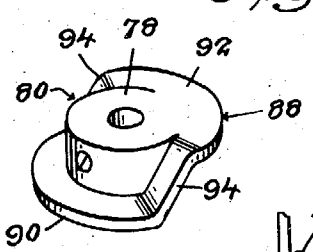
Figure 9 is a perspective view of a cam.

In Figure 9, the cam 80 includes a flange 88 having two vertically spaced portions 90 and 92 located at diametrically opposite points with respect to the axis of the cam. The portions 90 and 92 are interconnected by diagonal portions 94.

Figure 1:
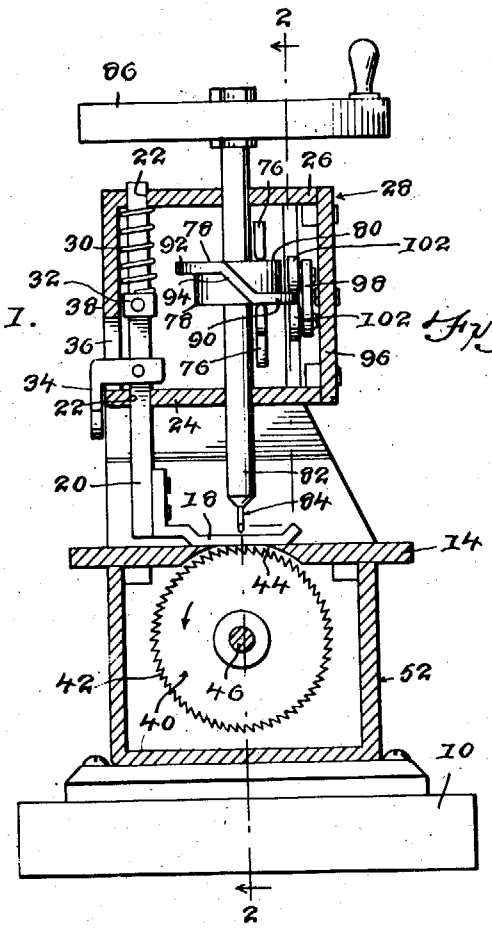
Figure 1 is a sectional view taken along the line 1—1 of Figure 2.
Figure 6:
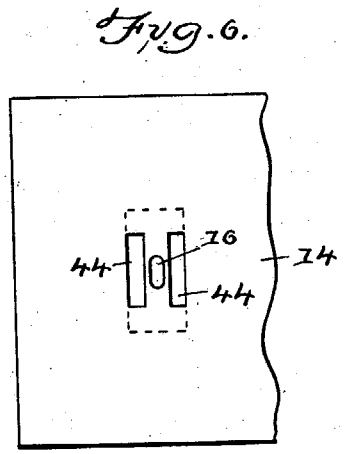
Figure 6 is a face view of the bed plate.

Reciprocatory motion of the needle bar 82 is effected by the following mechanism. On the wall 96 of the housing 28 is rotatably mounted a disk 98, as by a bolt 100. Two rollers 102 are rotatably mounted on the disk 98 and are spaced to receive therebetween the flange 88, including the diagonal cam portions 94 and their interconnecting portions 90 and 92, as illustrated in Figure 1. The disk 98 may oscillate slightly when the diagonal cam surfaces enter between the rollers 102 or depart from them. The bolt 100 is fixed but the rollers 102 are capable of some slight movement vertically by reason of the slight rotation of the disk 98 which carries them. This is because the rollers must adjust themselves to the turn or curves of the cam at the beginning and at the end of the diagonal portions 94; that is at the base and at the top of the cam surfaces. In such adjustment one roller moves slightly upwardly and the other roller at the same moment moves slightly downwardly. This movement will be obvious from the fact that the wheel or roller that goes around the outside of a corner or curve travels further than the one at the inside of the corner or curve. So the mounting of the rollers must oscillate to permit the rollers to adapt themselves to the cam. This is possible only by reason of the fact that the disk 98 is mounted so as to turn on its axial bolt 100. The movement is only slight, either clockwise or counterclockwise. Thus the needle bar is given a reciprocatory movement during its rotary motion.

In Figure 11, the bar 82 has an upward motion indicated by the arrow 104, a rotary motion through one-half revolution indicated by the arrow 106, a downward motion indicated by the arrow 108 and a rotary motion through one-half revolution indicated by the arrow 110. Since the needle 84 moves with the bar 82, a corresponding motion is imparted to the needle. In other words, the needle penetrates the work in its downward stroke, rotates one-half revolution, withdraws from the work and then makes another half revolution.

Figure 10:
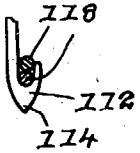
Figure 10 is a view of the fabric working end portion of the needle.

The lower part of the needle 84 is of U-shaped formation, as shown in Figure 10, having an upturned hook 112 providing a thread engaging crotch while the lower extremity tapers to a point indicated at 114.

Figure 5:
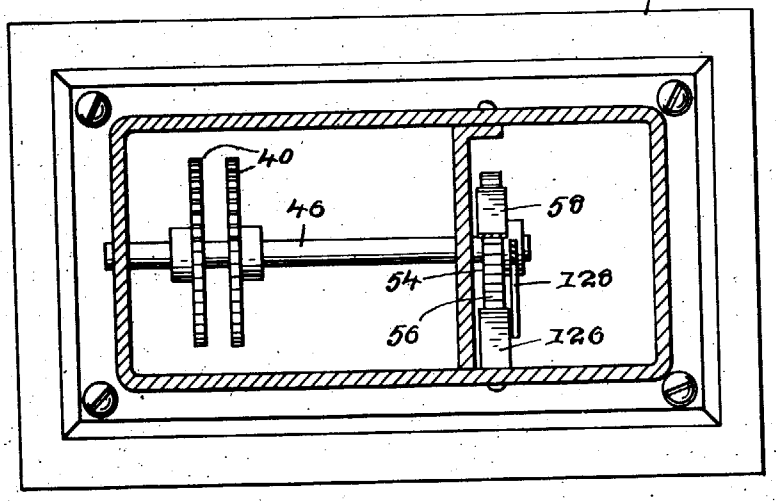
Figure 5 is a sectional view taken along the line 5—5 of Figure 2.
Figure 8:
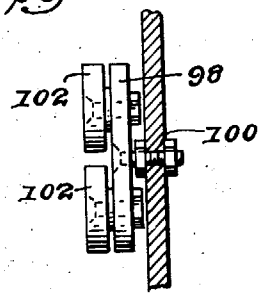
Figure 8 is a side view of the structure of Figure 7.
Figure 7:
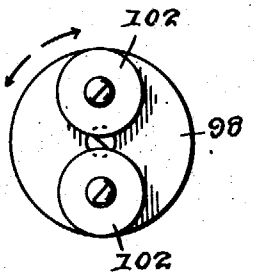
Figure 7 is a face view of cam actuator wheels.

A spring arm 126 fastened to the side wall of the machine frame is directed so that its end portion is resiliently pressed against the teeth 56 of wheel 54 to preclude reverse rotation of the wheel when the link 58 traverses its return in operative stroke. An inclined arm 128 having its upper end fastened against the wall 50 extends adjacent to one side edge of the lower part of the link 58 and the upper free end portion of the spring arm 126, as shown to advantage at Figures 2, 3 and 5 so that this inclined arm on one side and the wall 50 on the opposite side restrain sidewise movement of the link and spring arm to maintain the same in contact with the notches of the wheel 54.

During operation, as for example to stitch a pair of superposed sheets of fabric 116 fed horizontally from right to left along the bed 14 and under the presser 18, as viewed from Figure 1, the needle is initially caused to move downwardly from its uppermost position above the sheets, as shown at A in Figure 12, to penetrate both sheets. When the hook 112 attains its lowermost position below the sheets it is turned through a half-turn movement, as seen at B, following which it is pulled straight upward. During its return movement through the sheets it successively engages a pair of superposed threads thereof, indicated at 118, and elevates the same to looped arrangement as at C. After reaching its elevated position the needle is again turned through a half-turn and twists the loops 120 as shown at D. Upon subsequent descent of the needle from the last position the link 58 effects a one-step partial turn of wheel 54 and, through the shaft 46, similar movement of the feed wheels 40 in a counterclockwise direction, referring to Figure 1, to advance the sheets a predetermined step toward the left. Since the needle remains within the loops thus formed the latter are elongated and pulled into a position lengthwise of the upper surface of the upper sheet, the needle again penetrating the sheets in an advanced point. At the beginning of this additional penetration the loops remain above the uppermost of the layers of fabric and the needle passes downwardly within the loop. The action is clear, if it be assumed that the upper layer of fabric prevents the loop from following the needle downward. At the bottom of its stroke the needle is again turned so that during its subsequent upward stroke it again engages and loops a pair of threads which are drawn through the now stationary first loops as illustrated at F of Figure 12 and G of Figure 13. When the needle has again attained its top position it executes another half-turn and the sheets are advanced to the second step to bend the second loops 124 downwardly and enchain the first loop, as seen at H. The operation is repeated, as at I, for the desired length of the sheets to form a succession of chain stitches as shown at Figure 14, securely connecting the sheets of fabric.

I claim:

1. A sewing machine for uniting woven superposed fabrics, comprising a needle bar mounted for both rotary and reciprocatory movement, means for continuously rotating the needle bar, a needle carried by the needle bar having a hook shaped to pass freely through the fabrics and to pull threads from the fabrics upon withdrawal of the needle to form a loop from the thread, a cam means including a part adapted to cause the needle bar to reciprocate during rotation, whereby the said needle is caused to pass through the fabric and after a half-turn of the needle to pick up the threads and then to withdraw the needle from the fabric and during the next half-turn to impart a twist to said loop.

2. The invention described in claim 1 wherein a bed plate is provided for supporting the fabric and provided with an opening through which said needle passes, a rotary feed for the fabric, and an operating connection between said cam means and said rotary feed to impart feeding motion thereto.

3. The invention described in claim 1 wherein a bed plate is provided for supporting the fabric and having an opening for passage of the needle therethrough, said reciprocatory and rotary needle bar having said needle detachably connected therewith, said cam means comprising a cam fixed to said needle bar and a cam actuator imparting reciprocatory motion to the needle bar through relative rotation of the cam with respect to the actuator, a rotary feed member for the fabric, a notched wheel fixedly connected with said rotary feed member, a pivoted lever operatively connected with said cam to be rocked through reciprocatory motion of the bar and the cam, and an operating connection between said lever and said notched wheel to impart step by step rotary motion to said feed member.

4. The invention described in claim 1 wherein a bed plate is provided for supporting the fabric and having an opening for passage of the needle therethrough, said reciprocatory and rotary needle bar having said needle detachably connected therewith, said cam means comprising a cam fixed to said needle bar and a cam actuator imparting reciprocatory motion to the needle bar through relative rotation of the cam with respect to the actuator, a rotary feed member for the fabric, a notched wheel fixedly connected with said rotary feed member, a pivoted lever operatively connected with said cam to be rocked through reciprocatory motion of the needle bar and the cam, an operating connection between said lever and said notched wheel to impart step by step rotary motion to said feed member, a presser coacting with said bed plate, said presser being attached to a bar, non-circular in cross section and mounted in corresponding openings in a support therefor for guiding the presser bar in a reciprocatory path, a finger lift on said presser bar and spring means acting on said presser bar to yieldingly press the presser against the fabric on the bed plate.

5. A sewing machine for uniting woven superimposed fabrics, comprising a needle bar mounted for both rotary and reciprocatory movement, means for continuously rotating the needle bar, a needle carried by the needle bar having a hook shaped to pass freely through the fabrics and to pull threads from the fabrics upon withdrawal of the needle to form a loop from the threads, means for reciprocating the needle bar during rotation, as a result of which movements the said needle is caused to pass through the fabric, make a half-turn of the needle and thus pick up the threads, and then to withdraw from the fabric, to lengthen the loop, and then make a half-turn in which a twist is imparted to said loop.

6. The invention described in claim 1 wherein said needle is detachably connected with the rotary and reciprocatory needle bar, and in which said means for reciprocating the needle bar includes a rotatable cam and means for imparting a reciprocatory motion to the needle bar through relative rotation of said cam and said means for imparting a reciprocatory motion, said cam having a continuous flange provided with portions offset one from the other axially of the axis of rotation of the cam and interconnected by diagonal portions, said means for imparting a reciprocatory motion comprising two spaced cam engaging elements adapted to engage the opposite sides of said flange, and a mount for said cam engaging elements.

7. The method of mechanically uniting a plurality of super-imposed fabrics by means of separating and inter-looping their own threads as a source of thread for effecting the uniting and comprising subjecting said fabrics while in superimposed position to the following steps in sequence, mechanically separating a thread from a first one of said fabrics below the uppermost fabric by pulling the same through the fabrics thereabove and into spaced relation with respect to the surface of the uppermost fabric, forming said pulled thread into a loop above the uppermost fabric, feedingly moving said fabrics, elongating said loop in a direction opposite to that of the feed of the fabrics, again mechanically separating a thread from the same first one of said fabrics by pulling one of such threads into spaced relation to said fabrics and through said elongated loop, and successively repeating said steps.

8. The method of mechanically uniting a plurality of super-imposed fabrics by means of separating and inter-looping their own threads as the sole source of thread for effecting the uniting and comprising subjecting said fabrics while in superimposed position to the following steps in sequence, mechanically separating a thread from a first one of said fabrics below the uppermost fabric by pulling the same through the fabrics thereabove and into spaced relation with respect to the surface of the uppermost fabric, forming said pulled thread into a loop above the uppermost fabric, feedingly moving said fabrics, elongating said loop in a direction opposite to that of the feed of the fabrics, separating said loop from the needle so that the loop is above the uppermost of said super-imposed fabrics, passing the needle downwardly through said fabrics, and using the needle to again mechanically separate a thread from the same first one of said fabrics by pulling one of such threads into spaced relation to said fabrics and through said elongated loop, and successively repeating said steps.

9. The method of mechanically uniting a plurality of super-imposed fabrics by means of separating and interlooping their own threads as the sole source of thread for effecting the uniting and comprising subjecting said fabrics while in super-imposed position to the following steps in sequence, mechanically separating threads from each of said fabrics by pulling the threads into spaced relation with respect to the surface of the upper fabric, forming said pulled thread into a loop, feedingly moving said fabrics, elongating said loop in a direction opposite to that of the feed of the fabrics, again mechanically separating threads from each of the same fabrics by pulling such threads into spaced relation to said fabrics and through said elongated loop, and successively repeating said steps.

10. The method of mechanically uniting a plurality of super-imposed fabrics by means of separating and inter-looping their own threads as the sole source of thread for effecting the uniting and comprising subjecting said fabrics while in super-imposed position to the following steps in sequence, mechanically separating threads from each of said fabrics by pulling the threads into spaced relation with respect to the surface of the upper fabric, forming said pulled thread into a loop, feedingly moving said fabrics, elongating said loop in a direction opposite to that of the feed of the fabrics, separating said loop from the needle so that the loop is above the uppermost of said super-imposed fabrics, and passing the needle downwardly through said fabrics, and using the needle to again mechanically separate threads from each of the same fabrics by pulling such threads into spaced relation to said fabrics and through said elongated loop, and successively repeating said steps.

11. A sewing machine for uniting a plurality of superimposed fabrics by utilizing as a source of thread some of their own threads as binding means, comprising a needle bar, a hooked needle detachably and fixedly mounted in the end portion of said needle bar, means for rotating said needle bar on its longitudinal axis, means for intermittently reciprocating said needle bar during the rotation thereof for positioning the hooked portion of said needle periodically above and below said fabrics during said rotation and to move said hooked portion through the superimposed fabrics for engaging and separating certain threads thereof, and feeding means to move said fabrics beneath said needle.

12. A sewing machine for uniting a plurality of superimposed fabrics by utilizing as the sole source of thread some of their own threads as binding means, comprising a needle bar, a hooked needle detachably and fixedly mounted in the end portion of said needle bar, means for rotating said needle bar on its longitudinal axis, means for intermittently reciprocating said needle bar during the rotation thereof for positioning the hooked portion of said needle periodically above and below said fabrics during the rotation thereof and to move said hooked portion through the superimposed fabrics for engaging and separating some of the threads of the lowermost of the superimposed fabrics and pulling such threads upwardly into position above the uppermost of said fabrics, and feeding means to move said fabrics beneath said needle.

13. A sewing machine for uniting a plurality of superimposed fabrics by utilizing as the sole source of thread some of their own threads as binding means, comprising a needle bar, a hooked needle detachably and fixedly mounted in the end portion of said needle bar, means for rotating said needle bar on its longitudinal axis through an arc of about 180° while above said fabrics and through an arc of about 180° while below said fabrics, means for intermittently reciprocating said needle bar during the rotation thereof, for positioning the hooked portion of said needle periodically above and below said fabrics during the rotation thereof and to move said hooked portion through the superimposed fabrics for engaging and separating some of the threads of the lowermost of the superimposed fabrics and pulling such threads upwardly into position above the uppermost of said fabrics, feeding means to move said fabrics beneath said needle, a supporting surface for said fabrics while being so moved beneath said needle, and a presser bar holding said fabrics against said supporting surface.

14. A sewing machine for uniting a plurality of superimposed fabrics by utilizing as the sole source of thread some of their own threads as binding means, comprising a needle bar, a hooked needle detachably and fixedly mounted in the end portion of said needle bar, means for rotating said needle bar on its longitudinal axis, means for intermittently reciprocating said needle bar during the rotation thereof for positioning the hooked portion of said needle periodically above and below said fabrics during said rotation and to move said hooked portion through the superimposed fabrics for engaging and separating certain threads thereof, feeding means to move said fabrics beneath said needle, a supporting surface for said fabrics while being so moved beneath said needle, and a presser bar holding said fabrics against said supporting surface.

15. The method of mechanically uniting a plurality of superimposed fabrics by means of separating and interloping their own threads as the sole source of thread for effecting the uniting and which method comprises subjecting said fabrics while in superimposed position to the following steps in sequence, mechanically separating a thread from the lowermost one of said fabrics by pulling the same into spaced relation with respect to the upper surface of the uppermost fabric, forming said pulled thread into a first loop, feedingly moving said fabrics, elongating said first loop in a direction opposite to that of the feed of the fabrics, again mechanically separating a thread from the same lowermost fabric by pulling one of such threads as a second loop into spaced relation to the uppermost of said fabrics and through said first elongated loop, and successively repeating said steps.

16. The method of mechanically uniting a plurality of superimposed fabrics of which the lowermost member furnishes thread to secure the plurality of superimposed fabrics together, by means of separating and interlooping thread from such fabric as the sole source of thread for effecting the uniting and which method comprises subjecting said fabrics while in superimposed position to the following steps in sequence, mechanically separating a thread from the lowermost one of said fabrics by pulling the same into spaced relation with respect to the upper surface of the uppermost fabric, forming said pulled thread into a first loop, feedingly moving said fabrics, elongating said first loop in a direction opposite to that of the feed of the fabrics, again mechanically separating a thread from the same lowermost fabric by pulling one of such threads as a second loop into spaced relation to the uppermost of said fabrics and through said first elongated loop, and successively repeating said steps.

17. A sewing machine for uniting a plurality of superimposed fabrics by utilizing as the sole source of thread some of their own threads as binding means comprising a needle bar, a hooked needle detachably and fixedly mounted in the end portion of said needle bar, means for intermittently reciprocating said needle bar whereby said needle is reciprocated through the superimposed fabrics for engaging and separating certain threads of the fabrics, means for periodically moving said needle through an arc of approximately 180 degrees on its longitudinal axis while periodically its hooked part is below and above said fabrics to give the hooked needle the following motions in sequence, through the fabrics from above to below fabrics, through approximately 180 degrees motion on its longitudinal axis, through the fabrics from below to above fabrics, through approximately 180 degrees motion on its longitudinal axis, and repeating this sequence consecutively, and feeding means to move said fabrics beneath said needle.

18. The invention described in claim 1, wherein said needle is detachably connected with the rotary and reciprocatory needle bar, and in which said cam means comprises a cam fixed to said needle bar and having a continuous flange extending around said needle bar, a cam actuator for imparting reciprocatory motion to the needle bar through relative rotation of said cam, said flange being provided with portions offset one from the other axially of said needle bar and interconnected by diagonal portions, said actuator comprising two rotary wheels engaging opposite sides of said flange, and a mount for said wheels.

19. A sewing machine for uniting woven superposed fabrics, comprising a needle bar mounted for both rotary and reciprocatory movement, means for continuously rotating the needle bar, a needle carried by the needle bar having a hook shaped to pass freely through the fabrics and to pull threads from the fabrics upon withdrawal of the needle to form a loop from the thread, a second means adapted to cause the needle bar to reciprocate during rotation, whereby the said needle is caused to pass through the fabric and after a half-turn of the needle to pick up the threads and then to withdraw the needle from the fabric and after the next half-turn to impart a twist to said loop.

20. The invention described in claim 19 wherein a bed plate is provided for supporting the fabric and provided with an opening through which said needle passes, a rotary feed member for the fabric, and an operating connection between said means for reciprocating the needle bar and said rotary feed member to impart feeding motion thereto.

21. The invention described in claim 19 wherein a bed plate is provided for supporting the fabric and having an opening for passage of the needle therethrough, said reciprocatory and rotary needle bar having said needle detachably connected therewith, said second means for reciprocating said needle bar including a rotatable cam and means for imparting a reciprocatory motion to the needle bar through relative rotation of said cam and said means for imparting a reciprocatory motion, a rotary feed member for the fabric, a notched wheel fixedly connected with said rotary feed member, a pivoted lever operatively connected with said cam to be rocked through reciprocatory motion of the bar and the cam, and an operating connection between said lever and said notched wheel to impart step by step rotary motion to said feed member.

22. The invention described in claim 19 wherein a bed plate is provided for supporting the fabric and having an opening for passage of the needle therethrough, said reciprocatory and rotary needle bar having said needle detachably connected therewith, said second means for reciprocating said needle bar including a rotatable cam and means for imparting a reciprocatory motion to the needle bar through relative rotation of said cam and said last means, a rotary feed member for the fabric, a notched wheel fixedly connected with said rotary feed member, a pivoted lever operatively connected with said cam to be rocked through reciprocatory motion of the needle bar and the cam, an operating connection between said lever and said notched wheel to impart step by step rotary motion to said feed member, a presser coacting with said bed plate, said presser being attached to a bar, non-circular in cross section and mounted in corresponding openings in a support therefor for guiding the presser bar in a reciprocatory path, a finger lift on said presser bar and spring means acting on said presser bar to yieldingly press the presser against the fabric on the bed plate.

IVÁN M. A. GARCIA.

REFERENCES CITED

The following references are of record in the file of this patent:

UNITED STATES PATENTS

| Number | Name | Date |
|---|---|---|
| Re. 363 | Turner | Mar. 25, 1856 |
| 25,968 | Hudson | Nov. 1, 1859 |
| 1,538,744 | Ray | May 19, 1925 |
| 2,226,449 | Stephens | Dec. 24, 1940 |